United States Patent
Menjak et al.

(10) Patent No.: US 6,655,494 B2
(45) Date of Patent: Dec. 2, 2003

(54) ACTIVE FRONT STEERING ACTUATOR AND METHOD FOR CONTROLLING A VEHICLE

(75) Inventors: Ratko Menjak, Frankenmuth, MI (US); James Myrl Card, Lighthouse Point, FL (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/125,844

(22) Filed: Apr. 19, 2002

(65) Prior Publication Data

US 2003/0196849 A1 Oct. 23, 2003

(51) Int. Cl.[7] .................................................. B62D 5/04
(52) U.S. Cl. ........................ 180/446; 180/444; 701/41
(58) Field of Search ................................ 180/446, 444, 180/443, 403, 419; 74/393; 701/41

(56) References Cited

U.S. PATENT DOCUMENTS

| | | | |
|---|---|---|---|
| 2,936,643 A | 5/1960 | Smith et al. | |
| 4,009,641 A | 3/1977 | Rohde et al. | 91/375 A |
| 4,658,927 A | 4/1987 | Kanazawa | 180/142 |
| 5,174,407 A | 12/1992 | Shimizu et al. | 180/79.1 |
| 5,203,421 A | 4/1993 | Ueno et al. | 180/132 |
| 5,284,219 A | 2/1994 | Shimizu et al. | 180/79.1 |
| 5,341,701 A | 8/1994 | Krom et al. | 74/499 |
| 5,386,879 A | 2/1995 | Shimizu | 180/79 |
| 5,423,391 A * | 6/1995 | Shimizu | 180/79.1 |
| 5,489,004 A | 2/1996 | Shimizu et al. | 180/79 |
| 5,503,239 A | 4/1996 | Shimizu | 180/79 |
| 5,517,096 A | 5/1996 | Shtarkman et al. | 318/434 |
| 5,799,745 A * | 9/1998 | Fukatani | 180/410 |
| 6,000,491 A | 12/1999 | Shimizu et al. | 180/444 |
| 6,101,434 A * | 8/2000 | Irie et al. | 701/36 |
| 6,144,908 A * | 11/2000 | Yasuda | 701/41 |
| 6,155,377 A | 12/2000 | Tokunaga et al. | 180/446 |
| 6,173,221 B1 | 1/2001 | Boehringen et al. | 701/41 |
| 6,226,587 B1 * | 5/2001 | Tachihata et al. | 701/72 |
| 6,442,469 B1 * | 8/2002 | Matsuno | 701/70 |
| 6,470,994 B1 * | 10/2002 | Shimizu et al. | 180/446 |
| 6,499,559 B2 * | 12/2002 | McCann et al. | 180/446 |
| 6,547,031 B1 * | 4/2003 | Magnus | 180/444 |
| 6,556,909 B2 * | 4/2003 | Matsumoto et al. | 701/41 |
| 2001/0008986 A1 | 7/2001 | Brown et al. | 701/1 |
| 2001/0032748 A1 | 10/2001 | Demerly | 180/402 |
| 2001/0041957 A1 | 11/2001 | McCann et al. | 701/41 |
| 2001/0056317 A1 | 12/2001 | Nishizaki et al. | 701/48 |

\* cited by examiner

*Primary Examiner*—Lesley D. Morris
*Assistant Examiner*—Tony Winner
(74) *Attorney, Agent, or Firm*—Michael D. Smith

(57) ABSTRACT

A steering actuator comprising an intermediate shaft, an electric motor, a transmission, a first stopping device, a second stopping device, and a controller is provided. The steering column transmits a first rotational force to the intermediate shaft. The electric motor generates a second rotational force on a rotor shaft upon application of an electric current. The transmission transmits either or both of the first rotational force and the second rotational force to a lower shaft of a steering gear. The first stopping device prevents the first rotational force from being transmitted to the rotor shaft. Similarly, the second stopping device prevents the second rotational force from being transmitted to the steering column. The controller operates the steering actuator in a first mode, a second mode, or a third mode by selectively applying the electric current to the electric motor and the stopping devices.

27 Claims, 8 Drawing Sheets

ACTIVE FRONT STEERING ACTUATOR AND METHOD FOR CONTROLLING A VEHICLE

TECHNICAL FIELD

This disclosure relates to steering systems for vehicles that improve the stability of the vehicle. More specifically, this disclosure relates to an active front steering actuator and a method for controlling a vehicle.

BACKGROUND OF THE INVENTION

Motor vehicles, such as cars and trucks, require a steering system to control the direction of travel of the vehicle. The steering system controls the direction of travel of the vehicle through the control of one or more sets of road wheels. Such steering systems commonly transmit a driver's intent from a steering wheel to the road wheels via a mechanical steering linkage. Thus, movement of the steering wheel by the driver causes a corresponding movement of the road wheels. Hydraulic and/or electric motor assisting systems are commonly used in combination with such mechanical systems. These assisting systems reduce the driver effort necessary to actuate the mechanical system.

One example of a hydraulically assisted mechanical system is provided in U.S. Pat. No. 4,009,641. Here, a hydraulically assisted steering gear is provided. Another example of a hydraulically assisted steering gear is provided in U.S. Pat. No. 5,341,701. The content of each are incorporated herein in their entirety by reference thereto.

In addition to merely controlling the direction of travel of the vehicle, it is desired for the steering system to improve the stability of the vehicle.

Accordingly, continued improvements in stabilizing the control of the vehicle through the steering system are desired.

SUMMARY OF THE INVENTION

A steering actuator comprising an intermediate shaft, an electric motor, a transmission, a first stopping device, a second stopping device, and a controller is provided. The steering column transmits a first rotational force to the intermediate shaft. The electric motor generates a second rotational force on a rotor shaft upon application of an electric current. The transmission transmits either or both of the first rotational force and the second rotational force to a lower shaft of a steering gear. The first stopping device prevents the first rotational force from being transmitted to the rotor shaft. Similarly, the second stopping device prevents the second rotational force from being transmitted to the steering column. The controller operates the steering actuator in a first mode, a second mode, or a third mode by selectively applying the electric current to the electric motor and the stopping devices.

A method of controlling a set of road wheels of a vehicle is provided. The method comprises detecting a current yaw force of the vehicle; comparing the current yaw force to a predetermined yaw force limit; converting only a first rotational force from a steering column to a first degree of change of the road wheels if the current yaw force is not above the predetermined yaw force limit; and converting only a second rotational force from a source other than the steering column to a second degree of change of the road wheels if the current yaw force is above the predetermined yaw force limit. The second degree of change introduces a steering induced yaw force to the vehicle to cancel at least a portion of the current yaw force.

The above-described and other features are appreciated and understood by those skilled in the art from the following detailed description, drawings, and appended claims.

DESCRIPTION OF THE PREFERRED EMBODIMENT

Figure 1:
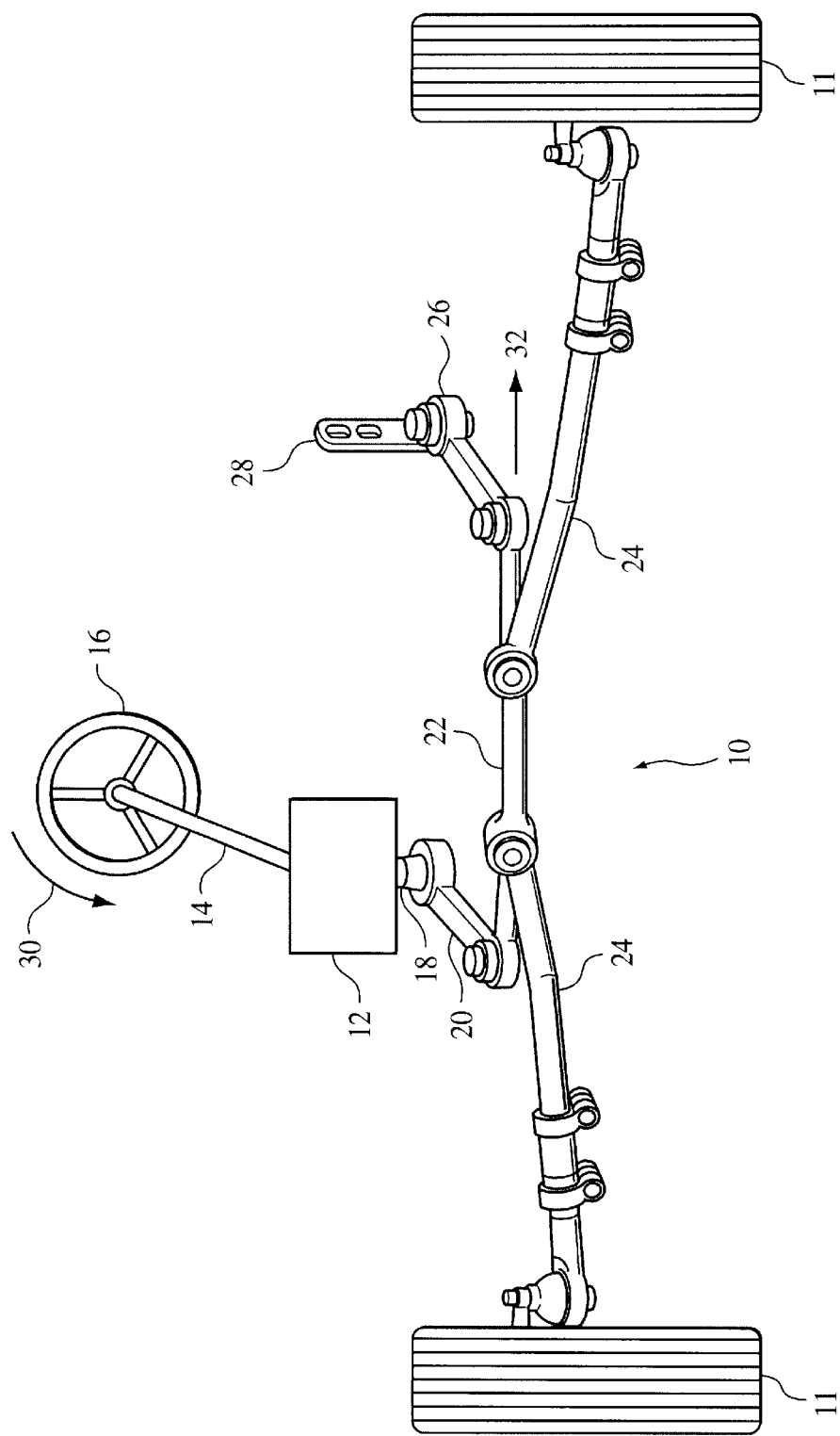
FIG. 1 is a perspective view of a steering system.

Referring now to FIG. 1, a steering system 10 configured for use with a vehicle (not shown) is illustrated. The steering system 10 is adapted to control the direction of a set of road wheels 11. The steering system 10 comprises a steering gear 12, a steering column 14, and a steering wheel 16.

The steering column 14 is configured to transmit rotational input from the steering wheel 16 to the steering gear 12. The steering column 14 is mounted in the vehicle in a manner that allows the column to rotate. The steering wheel 16 is operatively coupled to the upper end of the steering column 14. The lower end of the steering column 14 is operatively coupled to the steering gear 12. Thus, rotation of the steering wheel 16 is transmitted to the steering gear 12 by the steering column 14.

The steering gear 12 is adapted to convert the rotation of the steering column 14 to a movement of a pitman shaft 18. The pitman shaft 18 is operatively coupled to the road wheels 11 by way of a pitman arm 20, a center link 22, a pair of tie rods 24, and an idler arm 26. The free end of the idler arm 26 is secured to the vehicle by, for example, a mounting bracket 28.

For example, the rotation of the steering wheel 16 in a first direction 30 is translated to movement of the pitman arm 20. The movement of the pitman arm 20 causes the center link 22 to move in a first direction 32. The movement of the center link 22 is converted into a change in direction of the road wheels 11 by the tie rods 24 in a known manner. Thus, the steering system 10 controls the direction of travel of the vehicle's road wheels 11.

The steering gear 12 is described in detail with reference to FIG. 2. The steering gear 12 comprises a housing 34 adapted to receive the lower end of the steering column 14. The steering column 14 is operatively coupled to a piston 36 by way of a steering screw 38. The steering screw 38 comprises a lower shaft 33. A first end of the lower shaft 33 is connected to the lower end of the steering column. A second end of the lower shaft 33 comprises a thread 35 configured to mate with an inner surface 37 of the piston 36. The thread 35 and inner surface 37 are configured to convert the rotation of the steering screw 38 from the steering column 14 to a linear movement of the piston 36. Namely, the screw 38 acts as a ball screw and the piston 36 acts as a ball nut. Thus, the steering gear 12 converts the rotation of the steering column 14 to a linear movement of the piston 36.

The steering gear 12 is also configured to provide a hydraulic assist for moving the piston 36 linearly. Here, the steering screw 38 also includes a steering valve 40 operatively disposed therein. For purposes of clarity, the steering valve 40 has been turned out of plane with respect to the housing 34.

The housing 34 defines a hydraulic fluid chamber 42, an input port 44, and a return port 46. The chamber 42 is separated into a first section 48 defined to one side of the piston 36 (e.g., to the left), and a second section 50 defined to the other side of the piston (e.g., to the right). A hydraulic pump 52 provides a pressurized supply of hydraulic fluid to the chamber 42 via the ports 44 and 46. The sections 48 and 50 are sealed from one another by a seal 54. The seal 54 is configured to allow the piston 36 to move linearly in response to pressure in either the first section 48 or the second section 50. Thus, the seal 54 prevents the hydraulic fluid from crossing between the sections 48 and 50.

The steering valve 40 is configured to direct the pressurized supply of hydraulic fluid from the pump 52 to either the first section 48 or the second section 50 based upon the direction of rotation of the steering column 14. For example, the steering valve 40 comprises a spool 56 fixedly secured to a torsion bar 55. The torsion bar 55 is disposed in the lower shaft 33. Thus, rotation of the steering column 14 rotates the lower shaft 33 and deflects the torsion bar 55 an amount proportional to the degree of rotation of the steering column. The spool 56 is rotatable within a valve sleeve 58. Thus, the deflection of the torsion bar 55 by the steering column 14 acts to rotate the spool 56 within the valve sleeve 58.

The spool 56 has first axial slots 60 defined in its outer diameter. The first axial slots 60 are in fluid communication with the return port 46 of the pump 52. The valve sleeve 58 has second axial slots 62 and third axial slots 64 defined in its inner diameter. The second axial slots 62 are in fluid communication with the input port 44 of the pump 52. At least one of the third axial slots 64 is in fluid communication with the first section 48 via a first fluid flow passage 63. Similarly, at least one of the third axial slots 64 is in fluid communication with the second section 50 via a second fluid flow passage 65.

The first axial slots 60 on the spool 56 and the second axial slots 62 on the valve sleeve 58 interact to create a return flow path through the steering valve 40. Namely, when the steering column 14 is in the center position (e.g., no rotational input from the steering wheel), the spool 56 is in its center position. Here, the second slots 62 in the valve sleeve 58 bridge across a portion of two adjacent first slots 60 in the spool 56.

In this position, the hydraulic fluid from the pump 52 is allowed to freely flow from the input port 44 to the return port 46 through the valve 40. Namely, in this position the steering valve 40 does not direct any of the hydraulic fluid to the third axial slots 64. More specifically, in this position the steering valve 40 does not direct any of the hydraulic fluid to either the first section 48 or the second section 50.

However, rotation of the steering column 14 deflects the torsion bar 55 to rotate the spool 56 relative to the valve sleeve 58. Within a small degree of rotation of the spool 56, usually less than one degree, the flow paths created by the first and second slots (60 and 62) between the input and return ports (42 and 44) are closed off. The only remaining flow path is defined between the first slots 60 of the spool 56 and third slots 64 on the valve sleeve 58. Thus, a flow path is opened between input port 44 of the pump 52 and either the first section 48 via the first fluid flow passage 63 or the second section 50 via the second fluid flow passage 65.

Preferably, the pressure from the pump 52 that is transmitted through the first and third slots (60 and 64) is dependant on the degree of rotation of the spool 56. Thus, the steering valve 40 directs a pressurized supply of hydraulic fluid from the pump 52 to either the first section 48 or the second section 50 based upon the direction and amount of rotation of the steering column 14.

Pressure in the first section 48 acts on the piston 36 to assist in moving the piston away from the first section (e.g., to the right). Conversely, pressure in the second section 50 acts on the piston 36 to assist in moving the piston away from the second section (e.g., to the left). Accordingly, the steering gear 12 converts the rotation of the steering column 14 into a hydraulically assisted linear movement of the piston 36.

The piston 36 includes teeth 66 disposed on its outer surface. The pitman shaft 18 includes teeth 68 engaged with the teeth 66 of the piston 36. Thus, movement of the piston 36 laterally is converted via the teeth (66 and 68) to a rotational movement of the pitman shaft 18.

By way of example, the pump 52 is a vane pump comprising a vane 70, a pressure-limiting valve 72, and a fluid flow-limiting valve 74. Of course, other pumps are contemplated.

Figure 2:
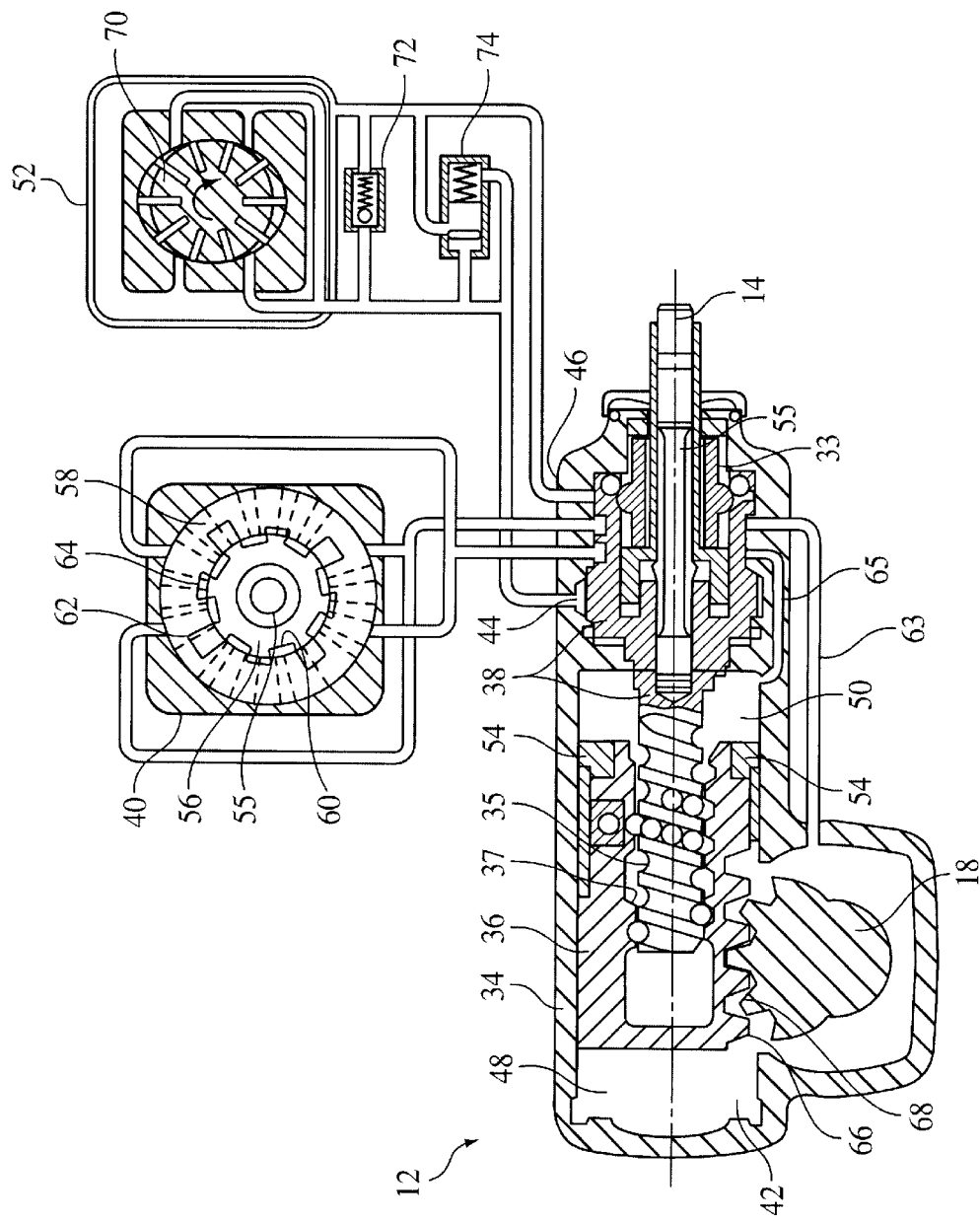
FIG. 2 is a sectional view of a hydraulically assisted steering gear for use with the steering system of FIG. 1.

The steering system 10 of FIGS. 1 and 2 has proven effective at controlling the direction of travel of the road wheels 11. This system 10 reduces the effort required to change to direction of the road wheels 11 by way of a hydraulic assist. However, the steering system 10 has a constant steering ratio. The term "steering ratio" is the ratio of the degree of change in the direction of the set of road wheels 11 to the degree of change in the direction of the steering wheel 16. By way example, the steering wheel 16 is configured for a range of motion of about 540 degrees of movement to either side of its center position (e.g., rotation of about 1.5 times in either direction). However, the set of road wheels 11 is configured for movement about 45 degrees to either side of its center position. Thus, the constant steering ratio of the steering system 10 is configured to convert about ten (10) degrees of movement of the steering wheel 16 to about 1.7 degrees of change of the road wheels 11. This steering ratio of 10 to 1.7 is constant regardless of the speed of the vehicle.

Various exemplary embodiments of active steering systems contemplated by the present disclosure are described in detail below with reference to FIGS. 3–8. Here, similar elements are numbered in multiples of one hundred. For purposes of clarity, various components of the steering valve, the input port, the return port, the fluid flow paths, and the like have been omitted from the Figures.

Figure 3:
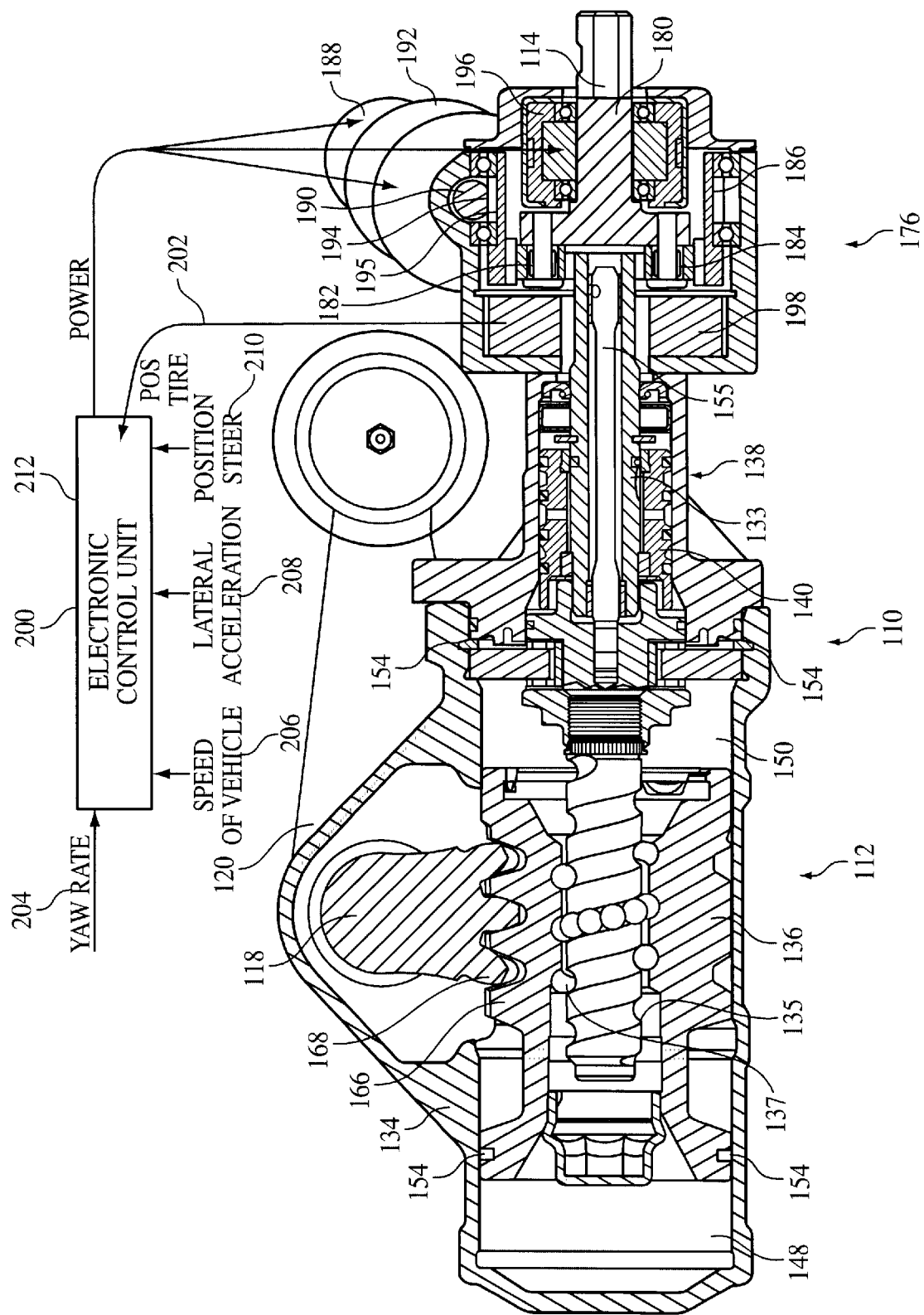
FIG. 3 is a sectional view of a first exemplary embodiment of a steering system.

Referring now to FIG. 3, a first exemplary embodiment of an active front steering system 110 is illustrated. The steering system 110 comprises a hydraulically assisted steering gear 112 and a steering actuator 176. The steering actuator 176 is operatively disposed between the steering gear 112 and the steering column 114.

The steering actuator 176 is configured to provide a variable steering ratio to the steering system 110. Namely, the steering actuator 176 provides a steering ratio that varies based upon the speed of the vehicle. Additionally, the steering actuator 176 is further configured to introduce a change in the direction of the road wheels without input of rotational forces from the steering column 114. Namely, the steering actuator 176 is adapted to actively control the steering system 110. As used herein, the terms "active control" and "active steering" is defined as the change of the direction of the road wheels without input of rotational forces from the steering column 114. Thus, the steering actuator 176 is configured to improve the stability of the vehicle.

The hydraulically assisted steering gear 112 comprises a housing 134, a piston 136, and a steering screw 138 having a lower shaft 133. The lower end of the lower shaft 133 comprises a thread 135 configured to mate with the inner surface 137 of the piston 136. The thread 135 and inner surface 137 are configured to convert the rotation of the lower shaft 133 to a linear movement of the piston 136.

The steering gear 112 also provides a hydraulic assist for moving the piston 136 linearly. Namely, the steering screw 138 also includes a steering valve 140 and a torsion bar 155. The steering valve 140 is configured to direct a pressurized supply of hydraulic fluid from a pump (not shown) to either the first section 148 or the second section 150 of the steering gear 112 based on the direction of deflection of the torsion bar 155. Again, the torsion bar 155 is configured such that the rotation of the lower shaft 133 deflects the torsion bar.

The valve 140 directs the pressurized supply of hydraulic fluid to either the first section 148 or the second section 150 in an amount proportional to the degree of rotation of the lower shaft 133. Pressure in the first section 148 acts on the piston 136 to assist in moving the piston away from the first section (e.g., to the right). Conversely, pressure in the second section 150 acts on the piston 136 to assist in moving the piston away from the second section (e.g., to the left).

Accordingly, the steering gear 112 converts the rotation of the lower shaft 133 into a hydraulically assisted linear movement of the piston 136. The piston 136 includes teeth 166 engaged with teeth 168 on the pitman shaft 118. Thus, movement of the piston 136 laterally is converted via the teeth (166 and 168) to a rotational movement of the pitman shaft 118, which changes the position of the road wheels.

The steering actuator 176 is operatively disposed between the steering gear 112 and the steering column 114. The actuator 176 comprises an intermediate shaft 180 that is fixedly connected to the steering column 114. The intermediate shaft 180 carries a pair of planetary gears 182 and 184. The planetary gears 182 and 184 engage a drive gear 186 to the upper end of the lower shaft 133.

The steering actuator 176 further comprises a first stopping device 188. The first stopping device 188 is disposed on a rotor shaft 190. The shaft 190 extends from the stopping device 188 through an electric motor 192. The electric motor is configured to rotate the rotor shaft 190 in a known manner. In order to prevent or resist rotation of the shaft 190, electrical power is applied to the stopping device 188, but not to the motor 192. Conversely, in order to rotate the shaft 190, the electric power is applied to the motor 192, but not to the stopping device 188. Thus, the first stopping device 188 is configured to apply a stopping or braking force to the shaft 190.

In an exemplary embodiment, the first stopping device 188 is an electrorheological (ER) or a magnetorheological (MR) fluid stopping device. Such MR fluid stopping devices are provided by co-pending U.S. application Ser. No. 09/825,793 assigned to the assignee of the present disclosure, filed on Apr. 4, 2001 entitled "Magnetorheological Fluid Stopper at Electric Motor", the content of which is incorporated herein in its entirety by reference thereto. In such a device, the viscosity of the fluid within the stopping device increases when an electric field (in the case of ER stopping devices) or a magnetic field (in the case of MR stopping devices) is applied to the fluid. The increase in viscosity offers a resistance to rotation of a shaft on which the stopping device is disposed.

The shaft 190 includes a worm pinion 194 disposed at an end opposite to the stopping device 188. The worm pinion 194 is engaged to a worm gear 195 that is disposed on the outside diameter of the drive gear 186. In this manner, the rotation of the shaft 190 by the motor 192 rotates the drive gear 186 via the worm pinion and gear 194 and 195. Conversely, the drive gear 186 is held in place by the stopping device 188 via the shaft 190, the worm pinion 194, and the worm gear 195.

The actuator 176 further includes a second stopping device 196 disposed on the intermediate shaft 180. Again, the second stopping device 196 is an ER or a MR fluid stopping device in an exemplary embodiment. The rotation of the steering column 114 is prevented or resisted by applying electric power to the second stopping device 196. Additionally, the actuator 176 includes a position sensor 198 disposed on the lower shaft 133. The position sensor 198 is configured to detect the position of the lower shaft 133.

It should be recognized that the first and second stopping devices 188 and 196 are described above by way of example only as MR fluid stopping devices. Of course, other stopping devices, such as but not limited to mechanical clutches, brakes, and the like, are contemplated for use with the active steering system of the present disclosure.

The actuator 176 is controlled by a controller 200. The controller 200 is configured to provide power to the electric motor 192, and the first and second stopping devices 188 and 196. The controller 200 is also configured to receive a position signal 202 from the position sensor 198. Since the rotation of the lower shaft 133 is converted into a change in direction of the road wheels, the controller 200 is adapted to convert the position signal 202 to a position of the road wheels.

The controller 200 is also configured to receive, for example, a yaw force or rate signal 204, a linear vehicle speed signal 206, a lateral acceleration signal 208, a steering wheel position signal 210, a variable/constant steering ratio mode signal 212, and the like.

Based on one or more of the signals 204, 206, 208, 210, and 212, the controller 200 is adapted to control the actuator 176 to operate the steering system 110 in several different modes. Namely, the actuator 176 is configured to operate the steering system 110 in any one of a constant steering ratio mode, a variable steering ratio mode, or an active steering mode. As described in more detail below, the steering system 110 operated in the constant steering ratio mode or the variable steering ratio mode based on, for example, receipt of variable/constant steering ratio mode signal 212 by the controller 200.

In the constant steering ratio mode, the controller 200 provides electric power to the first stopping device 188 to hold the drive gear 186 in place. However, the controller 200 does not provide power to either the motor 192 or the second stopping device 196. Thus, the rotation of the steering column 114 causes the intermediate shaft 180 to rotate. The rotation of the intermediate shaft 180 causes the planetary gears 182 and 184 to roll inside of the stationary drive gear 186 and to rotate the lower shaft 133. In the constant steering ratio mode, only the rotation of the steering column 114 changes the direction of the road wheels.

Using the example from above, the steering wheel 114 is configured for about 270 degrees of movement in each direction and the set of road wheels 11 is configured for about 45 degrees of movement in each direction. During the constant steering ratio mode, the steering system 110 converts about ten (10) degrees of movement of the steering wheel 114 to about 1.7 degrees of change of the road wheels.

In the variable steering ratio mode, the controller 200 selectively provides power to the electric motor 192 to rotate the drive gear 186, while turning off power to the first stopping device 188. In addition, the controller 200 does not provide power to the second stopping device 196. Thus, the rotation of the steering column 114 causes the intermediate shaft 180 to rotate. The rotation of the intermediate shaft 180 causes the planetary gears 182 and 184 to roll inside of the drive gear 186. At the same time, the drive gear 186 is selectively rotated by the motor 192. Thus, the lower shaft 133 is rotated by both the planetary gears 182 and 184 rolling inside of the drive gear 186, and by the movement of the drive gear. In sum, the direction of the road wheels is changed by the both the electric motor 192 and the steering column 114 in tile variable steering ratio mode.

In an exemplary embodiment, the controller 200 is configured to vary the steering ratio based upon the linear speed input 206. By varying the steering ratio based upon the linear speed of the vehicle, the steering system 110 increases the stability of the vehicle.

For example, the controller 200 controls the steering system 110 to provide a first steering ratio at slow vehicle speeds, such as might be experienced during parking maneuvers. Alternately, the controller 200 controls the steering system 110 to provide a second steering ratio at high speeds, such as might be experienced during highway driving. Here, the first steering ratio is larger than the second steering ratio. Thus, during slow speeds the steering system 110 is configured for ease of parking by requiring only small turns of the steering wheel 114 to achieve large changes in the road wheels. Conversely, during high speeds the steering system 110 is configured for vehicle stability by converting small turns of the steering wheel 114 to small, almost negligible changes in the road wheels.

For example, at less than 30 miles per hour (mph) the variable steering ratio of the steering system 110 could be configured to convert about 10 degrees of movement of the steering wheel 114 to about 2.6 degrees of change of the road wheels. Similarly, at higher than 30 mph the variable steering ratio of the steering system 110 could be configured to convert the same 10 degrees of movement of the steering wheel 114 to about 1.7 degrees of change of the road wheels.

It should be recognized that the steering system 110 is described by way of example only as having first and second steering ratios. Further, it should also be recognized that the steering system 110 is described by way of example only as converting 10 degrees of movement of the steering wheel rotation to about 2.6 degrees of movement of the road wheels at less than 30 miles per hour (mph) and to about 1.7 degrees at higher than 30 mph. Of course, it is contemplated for the steering system 110 to have more than two ratios, for the ratio to be linearly dependant on the speed of the vehicle, for the ratio to be non-linearly dependant on the speed of the vehicle, or combinations of any of the foregoing.

In the active steering mode, the controller 200 provides power to the electric motor 192 to rotate the drive gear 186 and provides power to the second stopping device 196 to resist movement of the steering column 114. However, the controller 200 does not provide power to the first stopping device 188.

The controller 200 utilizes the active steering mode to increase the stability of the vehicle. Specifically, the controller 200 compares the current yaw force signal 204 to a predetermined yaw force limit. As used herein, yaw force is the force of the movement of the vehicle about the vertical axis of the vehicle. Yaw forces above the predetermined limit are an indication of an adverse vehicle condition (e.g., a spin condition). If the yaw force signal 204 is above the predetermined yaw rate limit, then the controller 200 provides power to the electric motor 192 and the second stopping device 196.

The electric motor 192 rotates the drive gear 186. Meanwhile, the second stopping device 196 increases the torque necessary to rotate the steering column 114, and thus the torque necessary to rotate the intermediate shaft 180. Accordingly, the second stopping device 196 mitigates movement of the steering column 114 and the intermediate shaft 180. The rotation of the drive gear 186 causes the planetary gears 182 and 184 to rotate the lower shaft 133.

As described in detail above, the rotation of the lower shaft 133 is converted to a change in direction of the road wheels. Since the steering gear 112 is hydraulically assisted, the motor 192 does not need to be sized to turn the road wheels. Rather, the motor 192 is sized to apply a torque to the lower shaft 133 sufficient to deflect the torsion bar 155. This deflection activates the steering valve 140 to move the road wheels using only the hydraulic assist. In a preferred embodiment, the motor 192 is sized to change the direction of the road wheels by about ±3 degrees, with about ±5 degrees being more preferred. This change in the direction of the road wheels occurs within 0.5 second or less from the time when the yaw rate signal 204 is above the predetermined yaw rate limit. Moreover, this change in the direction of the road wheels occurs without input of rotational forces from the steering column 114 (e.g., independent of the driver).

The change in the direction of the road wheels induces a steering yaw force to the vehicle. The steering induced yaw force is configured to cancel at least a portion of the current yaw force as indicated by the yaw force signal 204. For example, if a current yaw force of the vehicle above the predetermined limit is in a first direction, then the steering system 110 actively changes the direction of the road wheels to induce a corrective yaw force in a direction opposite to the current yaw force. In this manner, the steering system 110 is configured to further improve the stability of the vehicle.

When in the active steering mode, the stopping device 196 can be controlled in several different ways to improve the stability of the vehicle. For example, the stopping device 196 could be controlled to eliminate all rotation of the steering column 114. In this situation, only the motor 192 changes the direction of the road wheels. Alternately, the stopping device 196 can be controlled to mitigate the rotation of the steering column 114. In this situation, the rotation of the steering column 114 with sufficient force to overcome the stopping device 196 will cause both the motor 192 and the steering column to change the direction of the road wheels. Of course, combinations of these two control scenarios of the stopping device 196 are contemplated.

In an alternate embodiment, the controller 200 utilizes the active steering mode in combination with a vehicle braking system (not shown) to further increase the stability of the vehicle. Here, the controller 200 induces the steering yaw force, while the vehicle braking system induces a braking yaw force. The vehicle braking system is adapted to induce the braking yaw force through the selective application of the braking devices at one or more of the vehicle's road wheels in a known manner. The combination of the steering and braking yaw forces act to cancel at least a portion of the current yaw force as indicated by the yaw force signal 204.

In addition to the stability improvements provided by the variable steering ratio mode and the active steering mode, the steering system 110 is also configured to improve the driver's feel of the steering system. For example, during the normal operation of the steering system 110, the driver continuously makes minor adjustments in the direction of the road wheels by way of moving the steering wheel in either direction. This may create undesired response delays and feedback when operating in the variable steering ratio mode. Namely, in the variable steering ratio mode the motor 192 rotates in a direction corresponding to the direction of rotation of the steering wheel 116. Thus, the back and forth movement of the steering wheel 116 causes the controller 200 to change the direction of the rotation of the motor 192.

Once the motor 192 is rotating in one direction, a certain amount of inertia is created in that direction. Suddenly reversing the direction of the motor 192 to accommodate for the normal changes in the steering wheel 116 causes the motor to first work against this inertia before rotating the drive gear in the opposite direction. Thus, the inertia of the motor 192 can cause an undesired response delay. Additionally, this inertia can be felt as an undesired feedback in the steering wheel 116 by the driver. The undesired feedback can be in the form of, for example, a "catch", "kick", "shudder", or "jolt", which can be felt through the steering wheel 116.

The first stopping device 188 can be controlled by the controller 200 to mitigate these inertia issues. Namely, the controller 200 can provide power to the first stopping device 188 for a brief period between changes in direction of the motor 192. Thus, the first stopping device 188 can be controlled by the controller 200 to dampen the inertia effects of the motor 192. Namely, the stopping device 188 can be controlled to reduce the delays and the undesired feedback caused by reversing the motor 192 back and forth during normal driving conditions.

In sum, the steering system 110 increases the stability of the vehicle with the variable steering ratio mode and the active steering mode. Moreover, the steering system 110 also mitigates the undesired delay and/or feedbacks from the system caused by the motor 192.

Figure 4:
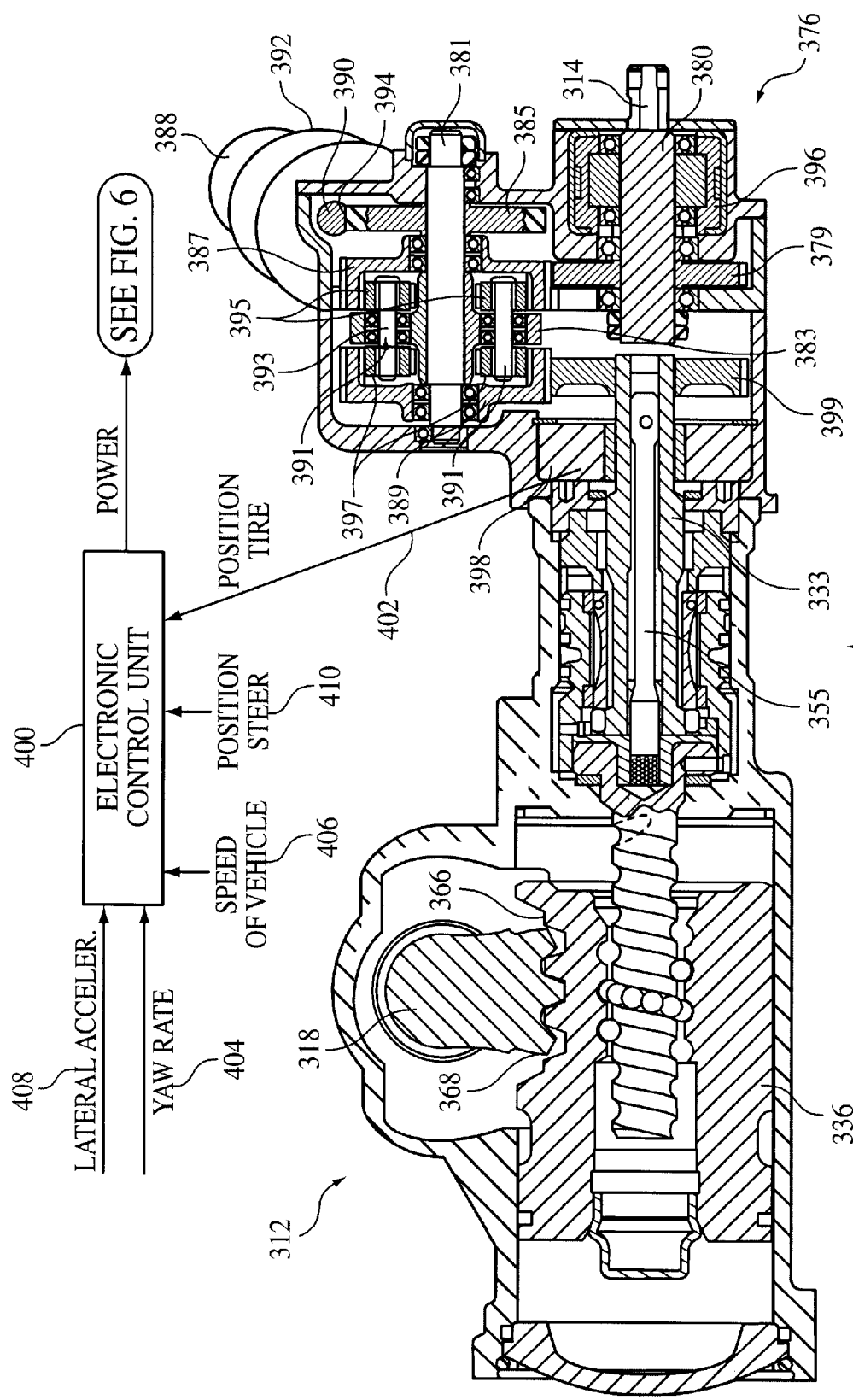
FIG. 4 is a sectional view of a second exemplary embodiment of a steering system.

Turning now to FIG. 4, an alternate exemplary embodiment of a steering system 310 is shown. The steering system 310 comprises a hydraulically assisted steering gear 312 and a steering actuator 376. The steering actuator 376 is operatively disposed between the steering gear 312 and the steering column 314.

Again, the hydraulically assisted steering gear 312 converts rotation of the lower shaft 333 and deflection of the torsion bar 355 to a hydraulically assisted linear movement of the piston 336. The linear movement of the piston 336 is converted via the teeth (366 and 368) to a rotational movement of the pitman shaft 318, which changes the position of the road wheels 311.

In this embodiment, the steering actuator 376 comprises an intermediate shaft 380 that is fixedly connected to the steering column 314. The intermediate shaft 380 carries an intermediate gear 379.

The steering actuator 376 also includes a parallel shaft 381 rotatably supported on a support member 383. The parallel shaft 381 includes a worm gear 385 fixedly secured thereto. The parallel shaft 381 also includes an upper gear 387 and a lower gear 389 rotatably supported thereon. Thus, the parallel shaft 381 is driven by the worm gear 385, but not by the upper and lower gears (387 and 389).

The upper gear 387 is engaged with the intermediate gear 379. The lower gear 389 is engaged to a driven gear 399 disposed on the lower shaft 333. The worm gear 385 is engaged with a worm pinion 394. The worm pinion 394 is disposed at one end of a rotor shaft 390. The rotor shaft 390 is operatively engaged in a motor 392. A first stopping device 388 is disposed at another end of the shaft 390.

A pair of planetary gear members 391 is disposed between the upper gear 387 and the lower gear 389. The planetary gear members 391 are rotatably supported in the support member 383. Each of the planetary gear members 391 includes a shaft 393 having an upper planetary gear 395 and a lower planetary gear 397 affixed thereto. The upper planetary gears 395 ride in the inner surface of the upper gear 387. Similarly, the lower planetary gears 397 ride in the inner surface of the lower gear 389.

The rotation of the steering column 314 causes the intermediate gear 379 to drive the upper gear 387. The parallel shaft 381 is fixed in place when the motor 392 is off and the stopping device 388 is on. Thus, the upper gear 387 rotates on the parallel shaft 381 without rotating the parallel shaft. As the upper gear 387 rotates, the planetary gear members 391 cause the lower gear 389 to rotate. Namely, the upper gear 387 drives the upper planetary gears 395, which causes the shafts 393 to drive the lower planetary gears 397. In turn, the lower planetary gears 397 drive the lower gear 389 such that the lower gear rotates. The rotation of the lower gear 389 causes the driven gear 399 to rotate, which in turn rotates the lower shaft 333. Thus, only the rotation of the steering column 314 rotates the lower shaft 333 when the motor 392 is off and the stopping device 388 is on.

However, when the motor 392 is on and the stopping device 388 is off, the motor rotates the parallel shaft 381 via the worm gear 385 and the pinion 394. The rotation of the parallel shaft 381 does not directly rotate the upper and lower gears 387 and 389. Rather, the rotation of the parallel shaft 381 causes the support 383 to rotate. The rotation of the support 383 rotates the shafts 393. The rotation of the shafts 393 cause the planetary gears 395 and 397 to drive the upper and lower gears 387 and 389. The rotation of the lower gear 389 causes the lower gear to rotate the driven gear 399, which in turn rotates the lower shaft 333. Thus, the motor 390 is configured to rotate the lower shaft 333.

The upper gear 387 does not impart rotation to the intermediate gear 379. For example, under the active steering mode the second stopping device 396 is powered and resists the rotation of the intermediate shaft 381 and the steering column 314. Alternately, under the variable steering ratio mode, the driver provides a resistance to the steering wheel 316 to resist the rotation of the steering column 314, and thus the intermediate shaft 381. In either example, since the intermediate shaft 381 resists rotation, the upper gear 387 does not impart a rotation to the intermediate gear 379, but rather it spins freely on the parallel shaft 381.

The actuator 376 is controlled by a controller 400. The controller 400 is configured to selectively provide power to the electric motor 392, and the first and second stopping devices 388 and 396. The controller 400 is also configured to receive a position signal 402 from the position sensor 398.

Since the rotation of the lower shaft 333 is converted into a change in direction of the road wheels 311, the controller 400 is adapted to convert the position signal 402 to a position of the road wheels 311.

The controller 400 is configured to control the actuator 376 to operate the steering system 310 in a constant steering ratio mode, a variable steering ratio mode, or an active steering mode.

In the constant steering ratio mode, the controller 400 provides electric power to the first stopping device 388 to hold the parallel shaft 381 in place. However, the controller 400 does not provide power to either the motor 392 or the second stopping device 396. Thus, in the constant steering ratio mode, only the rotation of the steering column 314 changes the direction of the road wheels 311.

In the variable steering ratio mode, the controller 400 selectively provides power to the electric motor 392 to rotate the parallel shaft 381, while turning off the first stopping device 388. In addition, the controller 400 does not provide power to the second stopping device 396. Thus, the direction of the road wheels 311 are changed by both the rotation of the steering column 314 and the motor 392.

Here, the controller 400 controls the stopping devices 388 and 396 and the motor 392, based upon the linear speed input 406, to vary the steering ratio. By varying the steering ratio, the steering system 310 increases the stability of the vehicle. Additionally, the controller 400 is configured to utilize the first stopping device 388 to dampen inertia forces from the motor 392. Namely, the controller 400 is configured to provide power to the stopping device 388 for a brief period between changes in direction of the motor 392 to further improve the steering system 310.

In the active steering mode, the controller 400 provides power to the electric motor 392 to rotate the parallel shaft 381 and provides power to the second stopping device 396 to resist movement of the steering column 314. However, the controller 400 does not provide power to the first stopping device 388. Thus, the direction of the road wheels 311 is changed by the motor 392 without input from the steering column.

Again, in the active mode, the controller 400 compares the current yaw force signal 404 to a predetermined yaw force limit. The controller 400 provides power to the electric motor 392 and the second stopping device 396 if the yaw force signal 304 is above the predetermined yaw rate limit. The resistance on the steering column 314 and the action of the motor 392 causes the motor to change the direction of the road wheels 311 by about ±3 degrees, with about ±5 degrees being more preferred. This change in the direction of the road wheels 311 occurs within 0.5 second or less from the time when the yaw rate signal 404 is above the predetermined yaw rate limit. Moreover, this change in the direction of the road wheels 311 occurs without driver input on the steering column 314. The change the direction of the road wheels 311 induces a steering yaw force to the vehicle to cancel at least a portion of the current yaw force.

In this manner, the steering system 310 is configured to improve the stability of the vehicle by providing the variable steering ratio mode, the active steering mode, and the dampening of the inertia from the motor 392.

Figure 5:
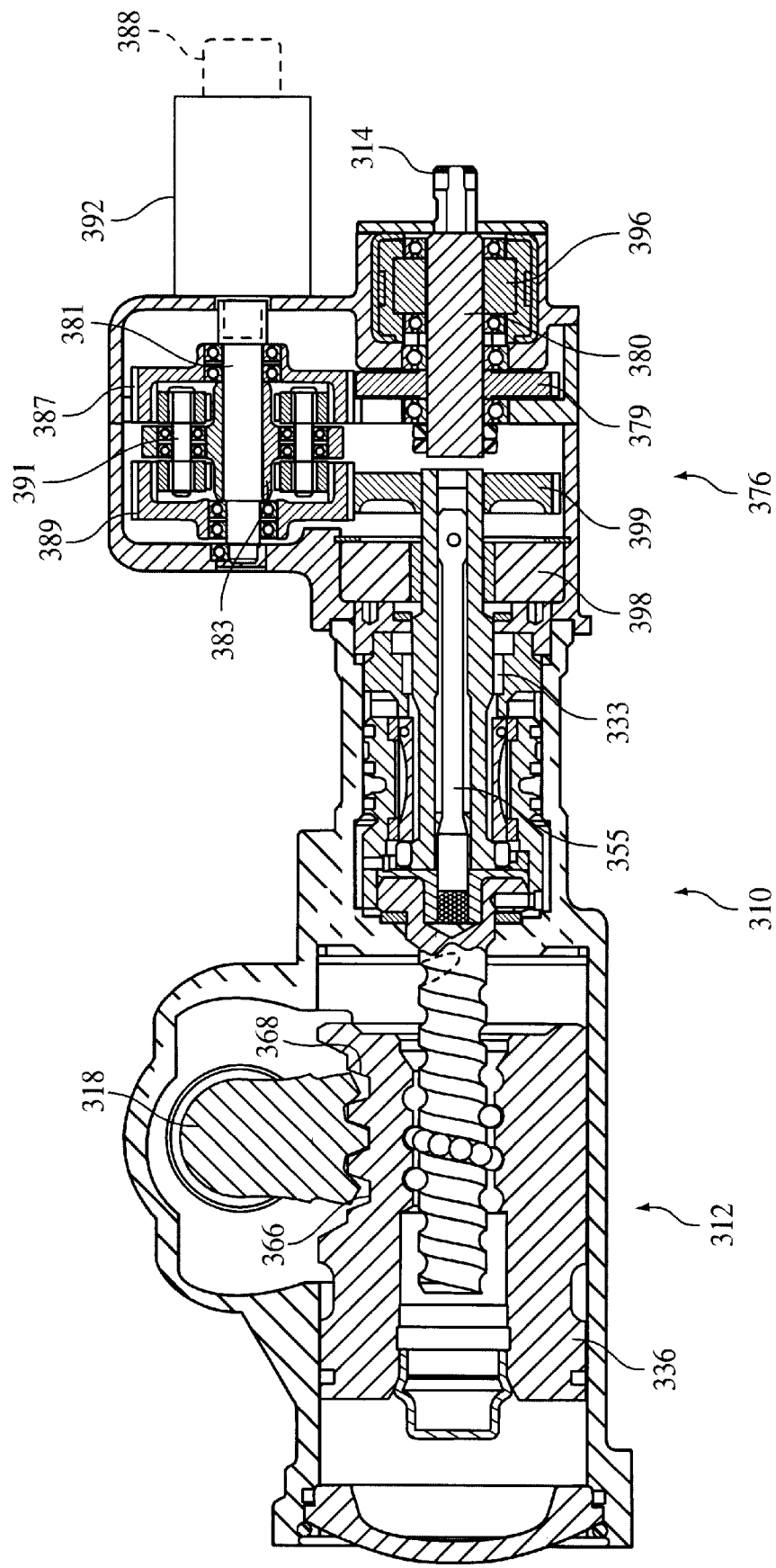
FIG. 5 is a sectional view of an alternate exemplary embodiment of the steering system of FIG. 5.

Turning now to FIG. 5, an alternate exemplary embodiment of the steering system 310 of FIG. 4 is shown. Here, the steering actuator 376 does not include the worm gear 385 and worm pinion 394. Thus in this embodiment, the motor 392 is connected directly to the parallel shaft 381. By eliminating the transmission (e.g., the worm gear and the worm pinion), the motor 392 must produce more torque than the embodiment of FIG. 4.

Figure 6:
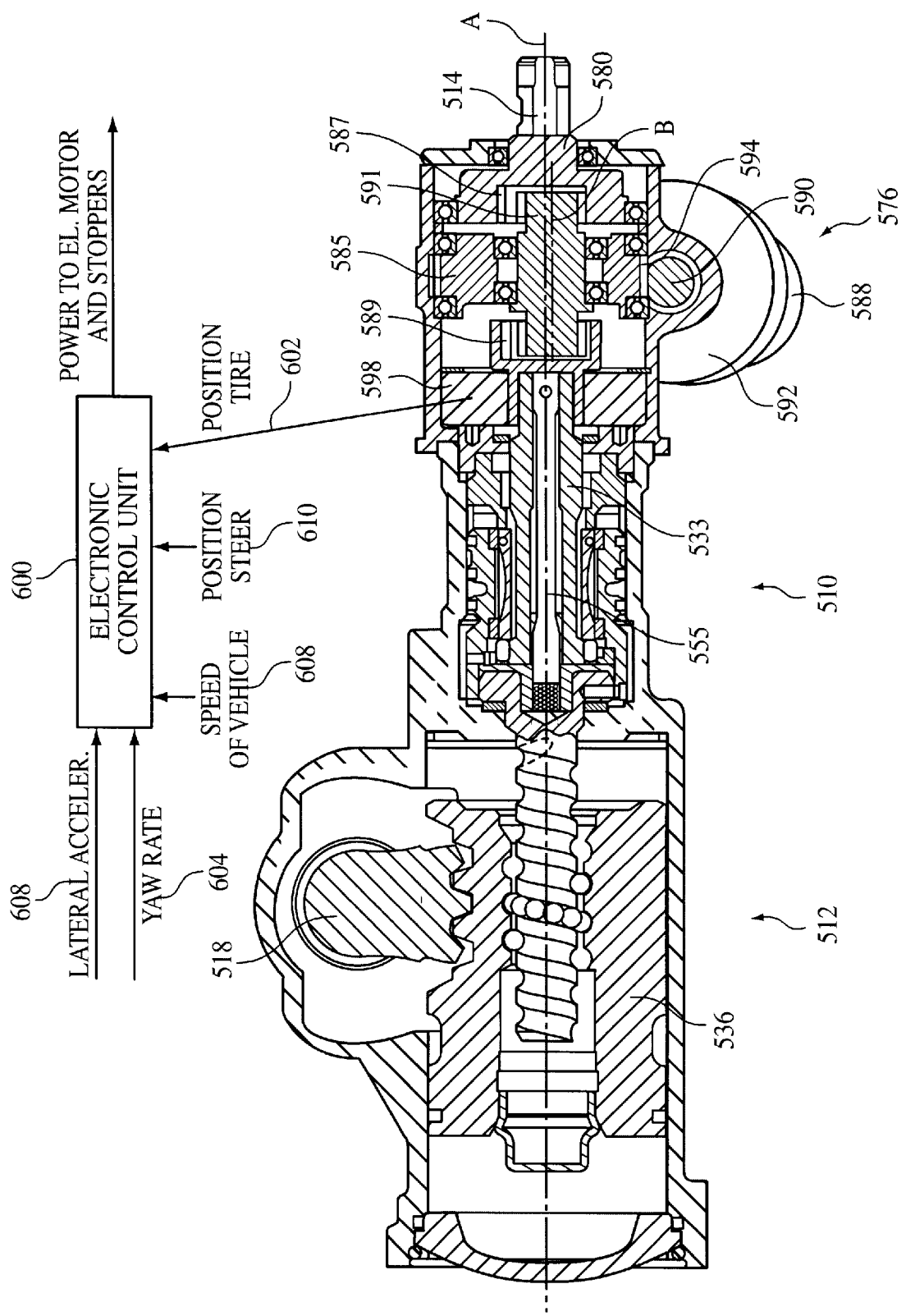
FIG. 6 is a sectional view of a third exemplary embodiment of a steering system.

Referring now to FIG. 6, a third exemplary embodiment of an active front steering system 510 is illustrated. The steering system 510 comprises a hydraulically assisted steering gear 512 and a steering actuator 576. The steering actuator 576 is operatively disposed between the steering gear 512 and the steering column 514.

Again, the hydraulically assisted steering gear 512 converts rotation of the lower shaft 533 and deflection of the torsion bar 555 to a hydraulically assisted linear movement of the piston 536. The linear movement of the piston 536 is converted to a rotational movement of the pitman shaft 518, which changes the position of the road wheels.

In this embodiment, the steering actuator 576 comprises an intermediate shaft 580 that is fixedly connected to the steering column 514. The lower end of the intermediate shaft 580 has an upper gear 587 defined therein. Similarly, the upper end of the lower shaft 533 has a lower gear 589 defined therein.

A planetary gear shaft 591 is disposed between the upper gear 587 and the lower gear 589. The planetary gear shaft 591 is rotatably supported by a worm gear 585. The worm gear 585 is held in place when the motor 592 is on and the stopping device 588 is off. Thus, rotation of the steering column 514 (about axis A) causes the upper gear 587 to rotate the planetary gear shaft 591 (about axis B). The planetary gear shaft 591 in turn rotates the lower gear 589 (about axis A), which causes the lower shaft 533 to rotate.

The worm gear 585 is rotatably supported in the actuator 576 and is engaged to a worm pinion 594. The worm pinion 594 is disposed at one end of a rotor shaft 590 of the motor 592. A first stopping device 588 is disposed at another end of the shaft 590. Thus, the motor 592 is configured to rotate the worm gear 585.

The worm gear 585 is rotated (about axis A) by the motor 592 being on and the stopping device 588 being off. The rotation of the worm gear 585 causes the planetary gear shaft 591 to roll within the upper and lower gears 587 and 589. Thus, the rolling of the planetary gear shaft 591 causes the lower gear 589 to rotate the lower shaft 533.

A second stopping device (not shown) is disposed on the steering column 514. Again, the steering column 514 is not rotated by the motor 592 either due to the activation of the second stopping device (e.g., the active steering mode) or due to the driver applying a resistance to the steering wheel 516 (variable steering ratio mode).

The actuator 576 is controlled by the controller 600. The controller 600 selectively provides power to the electric motor 592, and the first and second stopping devices. The controller 600 also receives the position signal 602 from the position sensor 598. Since the rotation of the lower shaft 533 is converted into a change in direction of the road wheels, the controller 600 is adapted to convert the position signal 602 to a position of the road wheels.

As described in detail above, the controller 600 is configured to control the actuator 576 to operate the steering system 510 in a constant steering ratio mode, a variable steering ratio mode, or an active steering mode.

In the constant steering ratio mode, the controller 600 provides electric power to the first stopping device 588 to hold the worm gear 585 in place. However, the controller 600 does not provide power to either the motor 592 or the second stopping device. Thus, in the constant steering ratio mode, only the rotation of the steering column 514 changes the direction of the road wheels.

In the variable steering ratio mode, the controller 600 selectively provides power to the electric motor 592 to rotate the worm gear 585, while turning off power to the first stopping device. In addition, the controller 600 does not provide power to the second stopping device. Thus, the direction of the road wheels is changed by both the steering column 514 and the motor 592.

Here, the controller 600 selectively controls the stopping devices and the motor, based upon the linear speed input 606, to vary the steering ratio. By varying the steering ratio, the steering system 510 increases the stability of the vehicle. Additionally, the controller 600 is configured to utilize the first stopping device 588 to dampen inertia forces from the motor 592. Namely, the controller 600 is configured to provide power to the stopping device 588 for a brief period between changes in direction of the motor 592.

In the active steering mode, the controller 600 provides power to the electric motor 592 to rotate the worm gear 585 and provides power to the second stopping device (not shown) to resist movement of the steering column 514. However, the controller 600 does not provide power to the first stopping device 588. Thus, the direction of the road wheels is changed by the motor 592, without input from the steering column 514.

Again, the controller 600 compares the current yaw force signal 604 to a predetermined yaw force limit. The controller 600 provides power to the electric motor 592 and the second stopping device if the yaw force signal 604 is above the predetermined yaw rate limit. The resistance on the steering column 514 and the action of the motor 592 causes the motor to change the direction of the road wheels by about ±3 degrees, with about ±5 degrees being more preferred. This change in the direction of the road wheels occurs within 0.5 second or less from the time when the yaw rate signal 604 is above the predetermined yaw rate limit. Moreover, this change in the direction of the road wheels occurs without drivers input on the steering column 514. The change the direction of the road wheels induces a steering yaw force to the vehicle to cancel at least a portion of the current yaw force.

In this manner, the steering system 510 is configured to improve the stability of the vehicle by providing the variable steering ratio mode, the active steering mode, and the dampening of the inertia from the motor 592.

Figure 7:
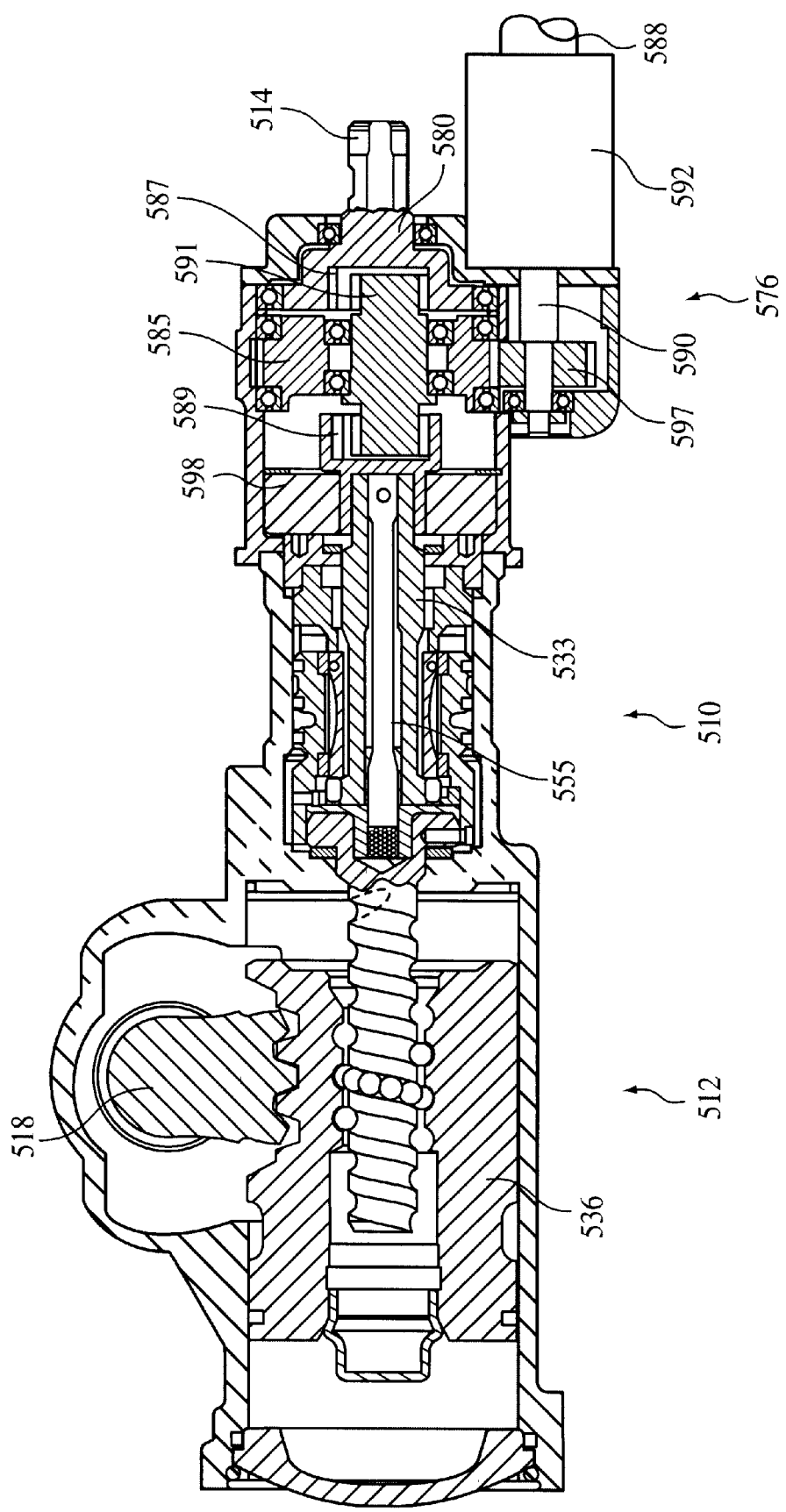
FIG. 7 is a sectional view of an alternate exemplary embodiment of the steering system of FIG. 6.

Turning now to FIG. 7, an alternate exemplary embodiment of the steering system 510 of FIG. 6 is shown. Here, the actuator 576 is slightly different. Namely, in this embodiment the shaft 590 of the motor 592 includes a radial gear 597 driving the worm gear 585. Accordingly, the axis of the motor 592 can be aligned with the axis of the steering column 514.

Figure 8:
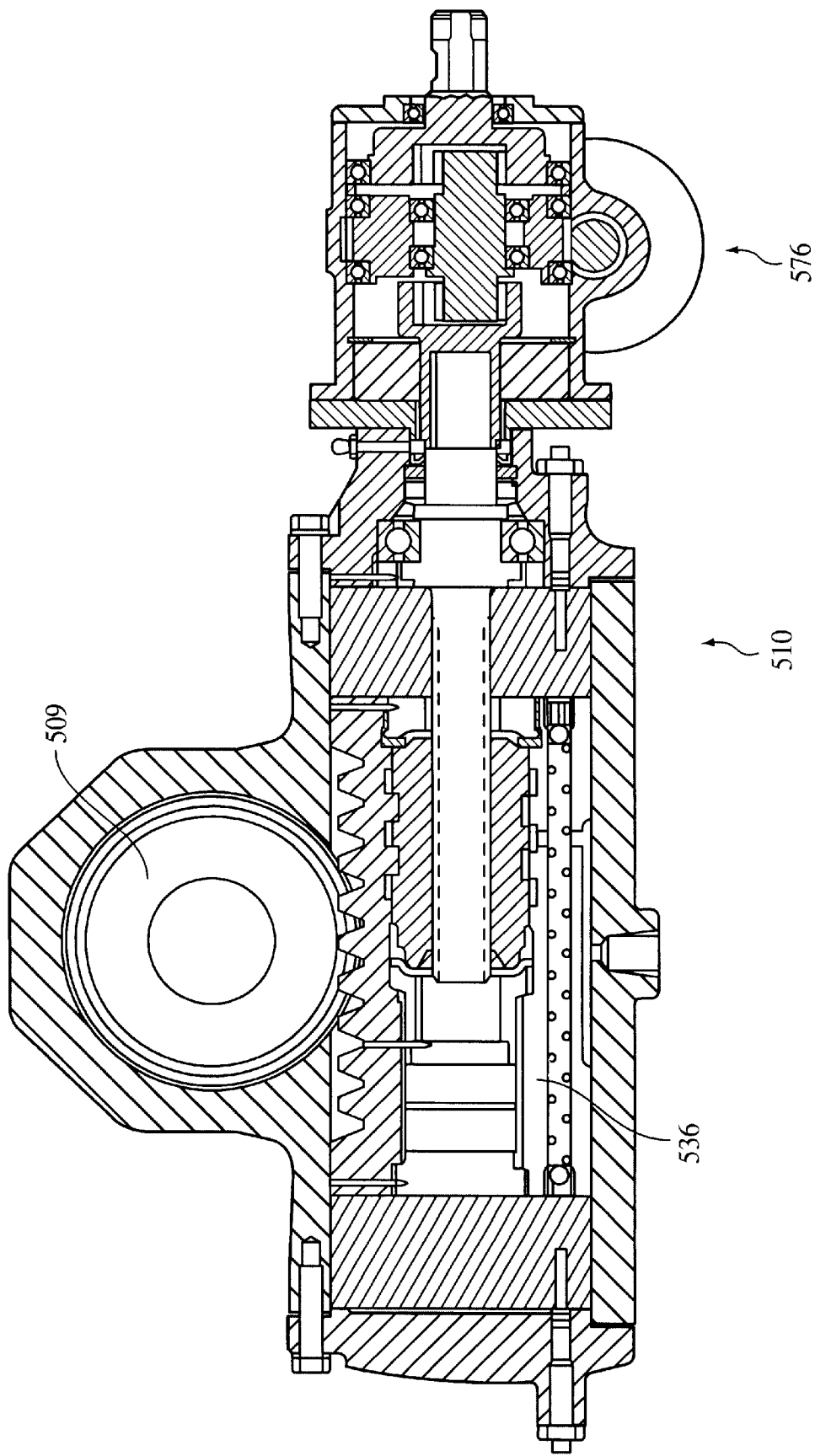
FIG. 8 is a sectional view of another alternate exemplary embodiment of the steering system of FIG. 6.

Turning now to FIG. 8, another alternate exemplary embodiment of the steering system 510 of FIG. 6 is shown. Here, the steering gear 512 does not include the pitman arm 518. Rather, the piston 536 is configured to mate with a shaft 509 and is adapted for use with tractor-trailer type trucks. It should be recognized that the shaft 509 is illustrated by way of example only as finding use with the steering actuator 576. Of course, the use of the shaft 509 with any of the steering actuators of the present disclosure is contemplated.

It should be noted that the terms "first", "second", and "third", and the like are used herein to modify elements performing similar and/or analogous functions. These modifiers do not imply a spatial, sequential, or hierarchical order to the modified elements unless specifically stated.

While the invention has been described with reference to one or more exemplary embodiments, it will be understood by those skilled in the art that various changes may be made and equivalents may be substituted for elements thereof without departing from the scope of the disclosure. In addition, many modifications may be made to adapt a particular situation or material to the teachings of the invention without departing from the essential scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. An active front steering actuator for use between a steering column and a steering gear of a vehicle, comprising:

an intermediate shaft being connectable to said steering column such that rotation of said steering column transmits a first rotational force to said intermediate shaft;

an electric motor being configured to generate a second rotational force on a rotor shaft upon application of an electric current, said electric motor being configured such that said second rotational force is reversible;

means for transmitting either or both of said first rotational force and said second rotational force to a lower shaft of said steering gear;

a first stopping device being configured to generate a first resisting force upon application of said electric current, said first resisting force being sufficient to prevent said first rotational force from being transmitted from said intermediate shaft to said rotor shaft by said transmitting means;

a second stopping device disposed on said intermediate shaft, said second stopping device being configured to generate a second resisting force upon application of said electric current, said second resisting force being sufficient to prevent said second rotational force from being transmitted from said rotor shaft to said steering column by said transmitting means; and a controller being configured to operate said steering actuator in a first mode, a second mode or a third mode by selectively applying said electric current to one, or more of said electric motor, said first stopping device, and said second stopping device.

2. The steering actuator as in claim 1, wherein said first stopping device and said second stopping device are electrorheological or magnetorheological fluid stopping devices.

3. The steering actuator as in claim 1, wherein said first and second rotational forces are sufficient to activate a hydraulic assist system of said steering gear.

4. The steering actuator as in claim 1, wherein said first mode is a constant steering ratio mode, said second mode is a variable steering ratio mode, and said third mode is an active steering mode.

5. The steering actuator as in claim 4, wherein said controller is configured to receive control signals selected from the group consisting of a yaw force signal, a vehicle speed signal, and a variable/constant steering ratio mode signal.

6. The steering actuator as in claim 5, wherein said controller operates said steering actuator in said first mode or said second mode depending upon said variable/constant steering ratio mode signal.

7. The steering actuator as in claim 6, wherein said first mode holds a steering ratio of said vehicle constant.

8. The steering actuator as in claim 7, wherein said controller applies said electric current to said first stopping device in said first mode such that only said first rotational force is transmitted by said transmitting means to only said lower shaft of said steering gear.

9. The steering actuator as in claim 6, wherein said second mode varies a steering ratio of said vehicle based upon said vehicle speed signal to provide a variable steering ratio to said vehicle.

10. The steering actuator as in claim 9, wherein said variable steering ratio is selected from the group consisting of a plurality of discrete steering ratios, linearly varied steering ratios, and non-linearly varied steering ratios.

11. The steering actuator as in claim 9, wherein said controller applies said electric current to said electric motor in said second mode such that both said first rotational force and said second rotational force are transmitted by said transmitting means to said lower shaft of said steering gear.

12. The steering actuator as in claim 11, wherein said controller applies said electric current to said first stopping device to generate said first resistance force to dampen inertial forces generated by said electric motor prior to reversing said second rotational force.

13. The steering actuator as in claim 5, wherein said controller operates said steering actuator in said third mode if said yaw force signal is above a predetermined yaw force limit.

14. The steering actuator as in claim 13, wherein said controller applies said electric current to said second stopping device and said electric motor in said third mode such that such only said second rotational force is transmitted by said transmitting means to said lower shaft of said steering gear.

15. The steering actuator as in claim 14, wherein said second rotational force is sufficient to cause said steering gear to change the direction of said vehicle's road wheels by about ±3 degrees.

16. The steering actuator as in claim 14, wherein said second rotational force is sufficient to cause said steering gear to change the direction of said vehicle's road wheels by about ±5 degrees.

17. The steering actuator as in claim 14, wherein said second rotational force introduces a steering yaw force to said vehicle to cancel at least a portion of said yaw force signal.

18. A method of controlling a set of road wheels of a vehicle, comprising:
    detecting a current yaw force of said vehicle;
    comparing said current yaw force to a predetermined yaw force limit;
    converting only a first rotational force from a steering column to a first degree of change of said road wheels if said current yaw force is not above said predetermined yaw force limit; and
    converting only a second rotational force from a source other than said steering column to a second degree of change of said road wheels if said current yaw force is above said predetermined yaw force limit, said second degree of change being configured to introduce a steering induced yaw force to said vehicle to cancel at least a portion of said current yaw force.

19. The method as in claim 18, wherein said source is an electric motor configured to provide said second rotational force.

20. The method as in claim 18, wherein converting only said first rotational force further comprises activating a first stopping device to prevent transmission of said first rotational force to said electric motor.

21. The method as in claim 18, wherein converting only said second rotational force further comprises activating a second stopping device to prevent transmission of said second rotational force to said steering column.

22. The method as in claim 18, further comprising:
    activating a braking device adapted to provide a stopping force to at least one road wheel if said current yaw force is above said predetermined yaw force limit, said stopping force being configured to introduce a braking induced yaw force to said vehicle, said braking induced yaw force being counter to said steering induced yaw force.

23. The method as in claim 18, further comprising:
    detecting a linear speed of said vehicle; and
    converting said first rotational force and said second rotational force to a third degree of change of said road wheels if said current yaw force is not above said predetermined yaw force limit, said third degree of change being provided by said electric motor and being based upon said linear speed.

24. The method as in claim 23, wherein said third degree of change of said road wheels is a variable steering ratio selected from the group consisting of a plurality of discrete steering ratios, linearly varied steering ratios, and non-linearly varied steering ratios.

25. The method as in claim 23, further comprising:
    activating a second stopping device to dampen an inertial force generated by said electric motor to prevent transmission of said inertial force to said steering column.

26. The method as in claim 23, wherein a hydraulically assisted steering gear is configured to convert said first rotational force to said first degree of change, said second rotational force to said second degree of change, and both said first and second rotational forces to said third degree of change.

27. The method as in claim 26, wherein said second degree of change is between about ±3 degrees and about ±5 degrees.

* * * * *